United States Patent
Fowell

(10) Patent No.: US 6,293,502 B1
(45) Date of Patent: Sep. 25, 2001

(54) SYSTEM AND METHOD FOR ENHANCED SOLAR ARRAY POINTING IN SUN-NADIR STEERING

(75) Inventor: Richard A. Fowell, Culver City, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/368,202

(22) Filed: Aug. 4, 1999

Related U.S. Application Data
(60) Provisional application No. 60/095,387, filed on Aug. 5, 1998.

(51) Int. Cl.[7] .................................................. B64G 1/24
(52) U.S. Cl. ............................................ 244/164; 244/173
(58) Field of Search ............................... 244/158 R, 164, 244/171, 173

(56) References Cited

U.S. PATENT DOCUMENTS

| | | | |
|---|---|---|---|
| 4,747,567 | * 5/1988 | Johnson et al. | 244/173 |
| 4,843,294 | * 6/1989 | Bhat et al. | 318/696 |
| 5,080,307 | * 1/1992 | Smay et al. | 244/164 |
| 5,149,022 | * 9/1992 | Flament | 244/168 |
| 5,277,385 | * 1/1994 | Flament | 244/164 |
| 5,412,574 | * 5/1995 | Bender et al. | 364/455 |
| 5,697,582 | 12/1997 | Surauer et al. . | |
| 5,794,891 | 8/1998 | Polle et al. . | |
| 5,895,014 | * 4/1999 | Sullivan | 244/168 |
| 5,974,238 | * 11/1999 | Surauer et al. | 244/171 |
| 6,070,833 | * 6/2000 | Burke et al. | 244/168 |

FOREIGN PATENT DOCUMENTS 0 195 554 B2   12/1993   (EP) .

OTHER PUBLICATIONS

R. McElvain, Effects of Solar Radiation Pressure On Satellite Attitude Control, ARS Guidance, Control, and Navigation Conference, Stanford, CA,. Aug. 7–9, 1961.

D. Cashmore, Earth Pointing Satellites: A Method of Attitude Control To Maximize Power From Solar Cell Arrays, Journal of the British Interplanetary Society, 1965–1966, vol. 20, pp. 63–71.

J. Fisher, M. Groble, N. Nguyen & W. Trochman, Magnetic Momentum Bias Attitude Control with Two–Gimballed Appendages, vol. 88, Advances in the Astronautical Sciences, Guidance and Control 1995, pp. 67–89.

(List continued on next page.)

*Primary Examiner*—Peter M. Poon
*Assistant Examiner*—Kevin Jakel
(74) *Attorney, Agent, or Firm*—T. Gudmestad

(57) ABSTRACT

A satellite (30) programmed for sun-nadir steering and having a solar wing (36) mounted to the satellite body (35) and being selectively moveable about two mutually orthogonal axes (A, B). The solar wing (36) is mounted to the satellite body (35) by a pair of gimbals (43, 45) thus allowing two degrees of freedom and thereby permitting the solar wing (36) to be rotated about the two mutually orthogonal axes (A, B). A first motor (42) in operative engagement with the gimbal (43) selectively rotates the solar wing about the axis (A), while a second motor (46) in operative engagement with the gimbal (45) selectively rotates the solar wing about the second axis (B). A control circuit (40) is in operative engagement with the first and second motors and selectively causes the first motor to rotate the solar wing about the first axis to a predetermined position, and selectively causes the second motor to rotate the solar wing about the second axis to a predetermined position.

28 Claims, 15 Drawing Sheets

OTHER PUBLICATIONS

T. Sarafin & W. Larson, Spacecraft Structures and Mechanisms—From Concept to Launch, Configuring a Spacecraft, Packaging and system Integration, pp. 472 to 477.

D. Murphy & D. Allen, Scarlet Development, Fabrication and Testing for the Deep Space 1 Spacecraft, Energy Conversion Engineering Conference, IECEC–97., Proceedings of the 332nd Intersociety, pp. 2237–2245, vol. 4.

D. Allen, P. Allen Jones, M. Piszczor, The SCARLET Light Concnetrating Solar Array, $25^{th}$ PVSC; May 13–17, 1996; Washington D.C., pp. 353 to 356.

H. Curtis & D. Marvin, Final Results from the PASP Plus Flight Experiment, Photovoltaic Specialists Conference, 1996., Conference Record of the 25th IEEE, VSC; May 13–17, 1996; Washington, D.C., pp. 195–198.

P. Conley, Space Vehicle Mechanisms, Elements of Successful Design.

* cited by examiner

SYSTEM AND METHOD FOR ENHANCED SOLAR ARRAY POINTING IN SUN-NADIR STEERING

STATEMENT REGARDING RELATED APPLICATIONS

This application claims domestic priority from an earlier filed provisional application, Ser. No. 60/095,387, filed Aug. 5, 1998.

FIELD OF THE INVENTION

The present invention relates generally to an improved system and method for reducing solar array sun-pointing error on satellites programmed for sun-nadir steering.

BACKGROUND OF THE INVENTION

A line between a satellite and the earth center of mass is typically called the nadir, while a line between the satellite and the sun is called a sunline. In a satellite programmed for sun-nadir steering these two lines are used as references to control the position of the satellite. In sun-nadir steering the spacecraft yaw axis is oriented toward the earth, generally coincident with the nadir. Any axis in the spacecraft can be pointed in any direction by rotating the spacecraft through two angles about any two fixed spacecraft axes. In conventional sun-nadir steering, the yaw axis is maintained earth pointed and the two rotation axes are chosen as yaw and pitch.

Conventional sun-nadir steering may be explained very simply as follows: 1) the spacecraft is yawed until the sun comes into the roll-yaw plane; 2) the solar array is pointed at the sun by rotating the solar array about a pitch gimbal until the solar array is normal to the sun. A more detailed description of sun-nadir steering may be found in *Effects of Solar Radiation Pressure on Satellite Attitude Control* by R. J. McElvain, published in Progress in Astronautics and Rocketry, Volume 8, Guidance and Control, published by Academic Press, 1962. The McElvain reference gives the body and wing steering equations, cited therein as equations 19 and 20.

The term sun-nadir steering may be used broadly, and may encompass steering laws that follow conventional sun-nadir steering as described above with substantive yawing and array pitch rotation over a significant period of time. Some examples include sun-target steering, rate limited sun-nadir steering, declination-limited sun-nadir steering, and the method disclosed in U.S. Pat. No. 5,794,891 issued to Polle et al. In sun-target steering, the yaw axis is pointed at a target other than nadir, such as a ground-fixed point. In rate-limited sun-nadir steering, the spacecraft yaw rate is limited, and the yaw rate is allowed to lag or lead the conventional sun-nadir profile to accommodate this yaw rate-limited configuration. In declination-limited steering, when the sunline is inconveniently close to the orbital plane, the spacecraft body is held orbit normal, and the solar array is pointed by a pitch gimbal.

On many spacecraft it is desirable to employ concentrator solar arrays, which provide more power per solar cell, thereby giving more power on a per unit cost basis. These concentrator arrays use mirrors or lenses that focus the sun's rays on small, high-temperature photovoltaic cells. However, these concentrator arrays typically must be pointed at the sun with a very high degree of accuracy in order to generate enough power to meet the bus requirements. The required pointing accuracy typically renders concentrator arrays unsuitable for use on satellites programmed for sun-nadir steering due to the sun tracking pointing error inherent when effectuating the noon turn (simply put, the satellite must "flip" at solar noon and solar midnight). The closer the sun lies to the orbit plane, the faster this "flip" must be done to point the arrays exactly at the sun.

Ideally, a spacecraft programmed for sun-nadir steering would effectuate the noon turn instantaneously when the sun is in the orbital plane. However, in practice the noon turn is both rate and acceleration limited, and thus there will always be sun tracking pointing error during portions of the turn in this case. Nevertheless, it would be highly desirable to have a spacecraft programmed for sun-nadir steering that is equipped with concentrator arrays, and which minimizes sun-tracking pointing error during portions of the noon-turn.

The solar arrays for satellites programmed for sun-nadir steering are conventionally sized to account for the fact that the solar arrays will experience power loss due to sun tracking pointing error during portions of the noon turn. This power loss is a especially problematic on high power satellites or on satellites in a low earth orbit having high orbital rates, which sometimes have orbital periods of as low as ninety minutes. The power loss when the solar arrays are not perpendicular to the sunlight is not significant for non-concentrated solar arrays because the power loss due to the non-perpendicularity goes roughly with the cosine of the angle away from perpendicularity. Therefore, an error angle of 25 degrees still allows for cosine(25 degrees)=0.906 of the power—over 90%.

For concentrator panels, however, the reduction in power with error angle is typically linear. Consequently, conventional sun-nadir satellites with concentrator arrays would require relatively large solar arrays and additional batteries, all of which increases weight, in order to account for the resulting loss in sunlight exposure due to sun tracking pointing error. Unfortunately, the extra weight increases the rotational moment of inertia of the spacecraft, which in turn necessitates the use of larger reaction wheels to perform the noon turn. The larger reaction wheels in turn increase the spacecraft weight even more. As the weight increases, the achievable slew rate is reduced, which negatively impacts the sun tracking pointing error during the noon turn.

It is known to point a solar array accurately at the sun by means of a two-axis gimbal between the solar array and the spacecraft body. Such a system is described, for example, in Fisher et al., "Magnetic Momentum Bias Control With Two-Gimballed Appendages", Paper No. AAS 95-005, at page 72, which can be found in Volume 88 of *Advances in the Astronautical Sciences*, published for the American Astronautical Society. As discussed therein, the body is held fixed with respect to nadir and the orbit, the inner gimbal rotates at orbit rate, and the outer gimbal tracks out the angle between the orbit and the sunline. This approach has many disadvantages. First, the outer gimbal deflections required can be very large (the Fisher article shows 90 degrees) and can stay that way for many orbits. Such large and persistent gimbal travel sweeps the array through a spacecraft body field of view, potentially intruding into the fields of view of sensors, the payload field of view, thermal radiators, and even into thruster plumes. It also creates large variations in the spacecraft inertia matrix and can create severe gravity gradient torques in low orbits. Furthermore, the benefits of sun-nadir steering in limiting the momentum buildup from solar torques, and of limiting the directions that sunlight can intrude on radiators, payloads, etc., are lost. Thus, it would be desirable to avoid, minimize, or even eliminate one or more of the above-cited problems.

SUMMARY OF THE INVENTION

According to one aspect of the invention, a satellite is programmed for sun-nadir steering and includes a solar wing mounted to the satellite body. The solar wing is mounted to the satellite body by a gimbal having two degrees of freedom to thereby permit the solar wing to be rotated about two mutually orthogonal axes. A first motor in operative engagement with the gimbal selectively rotates the solar wing about a first axis, while a second motor in operative engagement with the gimbal selectively rotates the solar wing about a second axis. A control circuit in operative engagement with the first and second motors selectively causes the first motor to rotate the solar wing about the first axis to a predetermined position, and selectively causes the second motor to rotate the solar wing about the second axis to a predetermined position.

In further accordance with a preferred embodiment of the invention, the first and second motors are stepper motors. The control circuit causes the first and second motors to move the solar wing about the first and second axes to a position wherein the solar array is substantially perpendicular to sunlight. Preferably, the control circuit is programmed to maintain the solar array within 1° of perpendicular to the sunlight, and the solar array comprises a concentrator array. The control circuit may select the position of the solar wing by monitoring the amount of power produced by the solar array, by means such as a wing-mounted sun sensor, or may select the position of the solar wing based on ephemeris data stored in memory. The control circuit preferably comprises a microprocessor, and includes a closed loop circuit or an open loop circuit for controlling the movement of the solar wing about the first and second axes. A closed loop circuit comprises the control circuit, the stepper motors, the solar wing, and a power sensing circuit.

The satellite may include a second solar wing having attached thereto a second solar array, with the first and second solar wings being located on opposite sides of the satellite body. The second solar wing is also mounted to the satellite body by a gimbal having two degrees of freedom, to thereby permit the second solar wing to be rotated about two mutually orthogonal axes. The second gimbal is in operative engagement with another pair of motors for selectively rotating the second solar wing about the first and second axes, respectively. The control circuit is adapted to pivot the solar wings in substantially equal directions about the first axis, and is further adapted to pivot the solar wings in substantially equal directions about the second axis.

In accordance with another aspect of the invention, a satellite for use in a non-geostationary orbit includes a satellite body, an onboard attitude control system programmed for sun-nadir steering, and a solar wing mounted to the satellite body by a yoke rotatable about a first axis. The yoke includes a gimbal rotatable about a second axis perpendicular to the first axis. The solar wing includes at least one solar array. A first motor is in operative engagement with the yoke for selectively rotating the solar wing about a first axis, and a second motor is in operative engagement with the gimbal for selectively rotating the solar wing about a second axis. A control circuit is in operative communication with the first and second motors for selectively causing the first motor to rotate the solar wing about the first axis and for selectively causing the second motor to rotate the solar wing about the second axis.

In accordance with yet another aspect of the invention, a method for decreasing the power requirements of a satellite in a low earth orbit and having a solar wing comprises the steps of programming an onboard attitude control system for sun-nadir steering, rotating the solar wing about a first axis and pivoting the solar wing about a second axis to maintain the solar array substantially normal to the sunline.

In accordance with a still further aspect of the invention, a method for decreasing the power requirements of a satellite in a low earth orbit, the satellite including a power generating solar wing, comprises the steps of programming an onboard attitude control system for sun-nadir steering, rotating the solar wing about a first axis, and pivoting the solar wing about a second axis to substantially maximize the solar wing output.

These and other objects, features and advantages of the present invention will become readily apparent to those skilled in the art upon a reading of the following description with reference being had to the accompanying drawings.

DESCRIPTION OF THE PREFERRED EMBODIMENT

Figure 1:
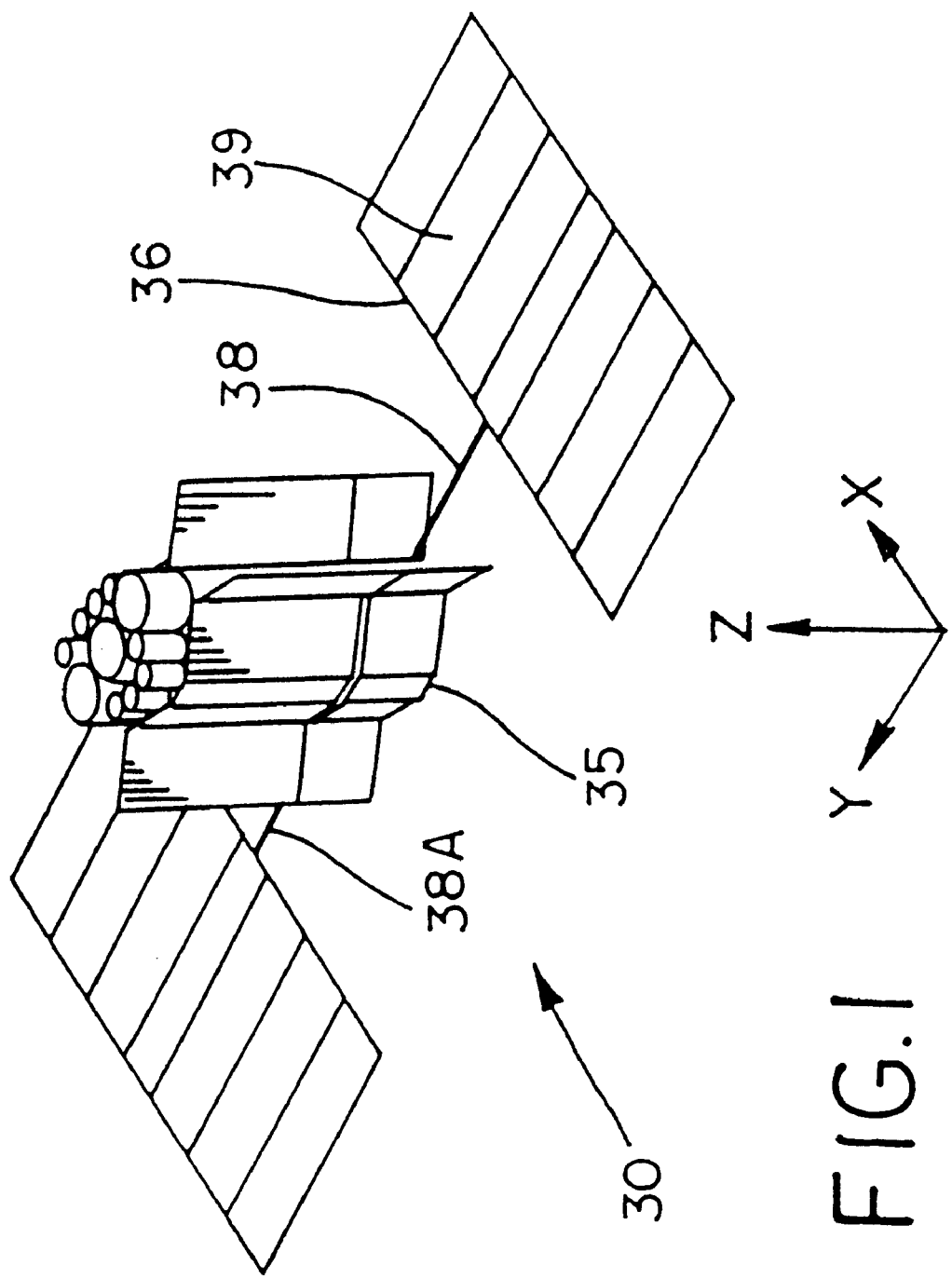
FIG. 1 is a perspective view of a satellite constructed in accordance with the teachings of the present invention.

A satellite 30 assembled in accordance with the teachings of the present invention is illustrated in FIG. 1. The satellite has an onboard attitude control system (ACS) 32 (FIGS. 6 and 7) programmed for sun-nadir steering in a manner well known to those of skill in the art, and further in a manner that requires turning of the satellite 30 at local noon and local midnight in order to prevent certain portions of the satellite, (i.e., the "cold" side of the satellite), from being exposed to solar irradiation. In so doing, the negative roll axis is maintained away from the sun. The concept as well as the effectuation of the "noon-turn" is well known to those of skill in the art and will not be discussed further herein.

Figure 2:
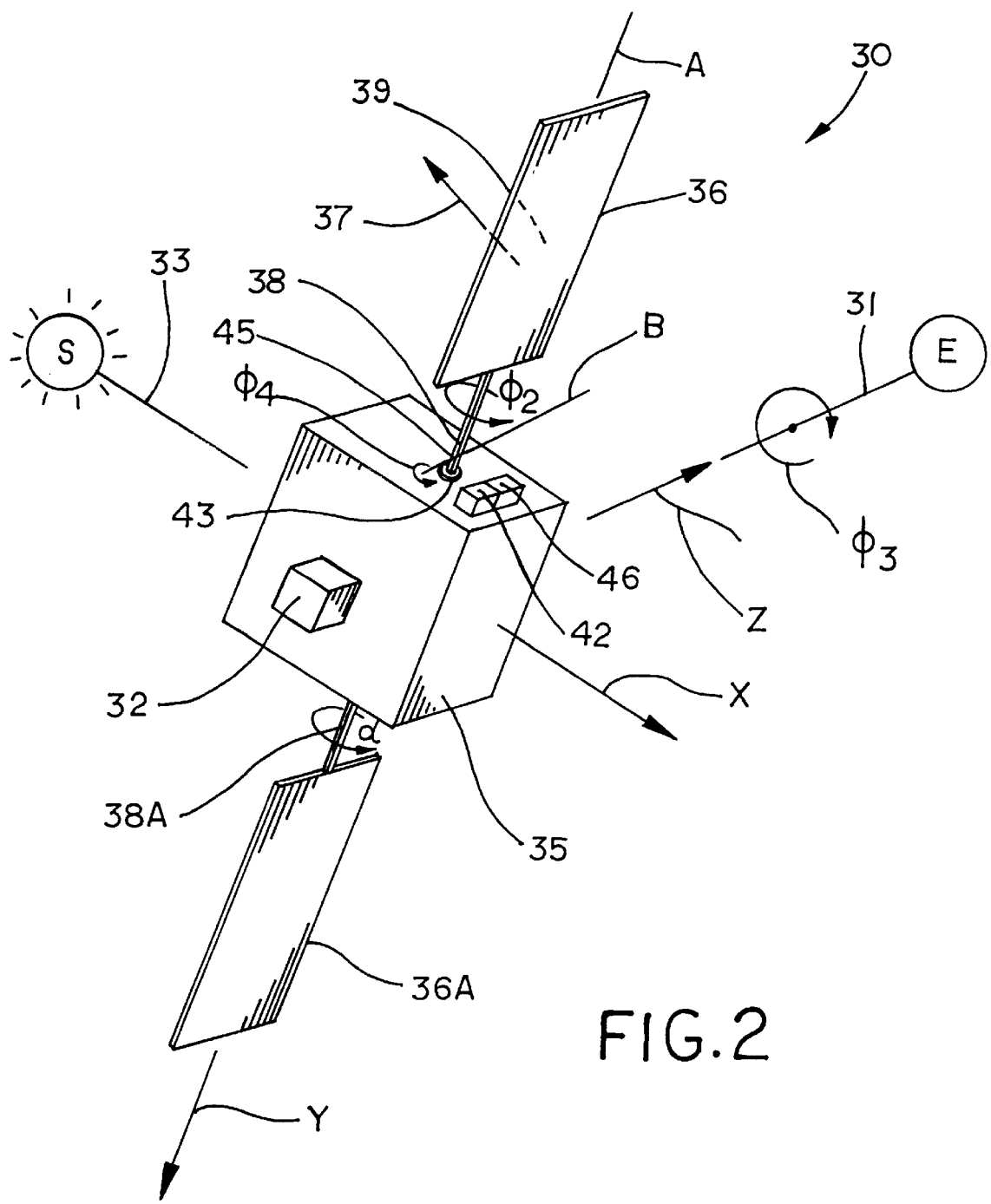
FIG. 2 is an enlarged schematic illustration of the satellite illustrated in FIG. 1.
Figure 3:
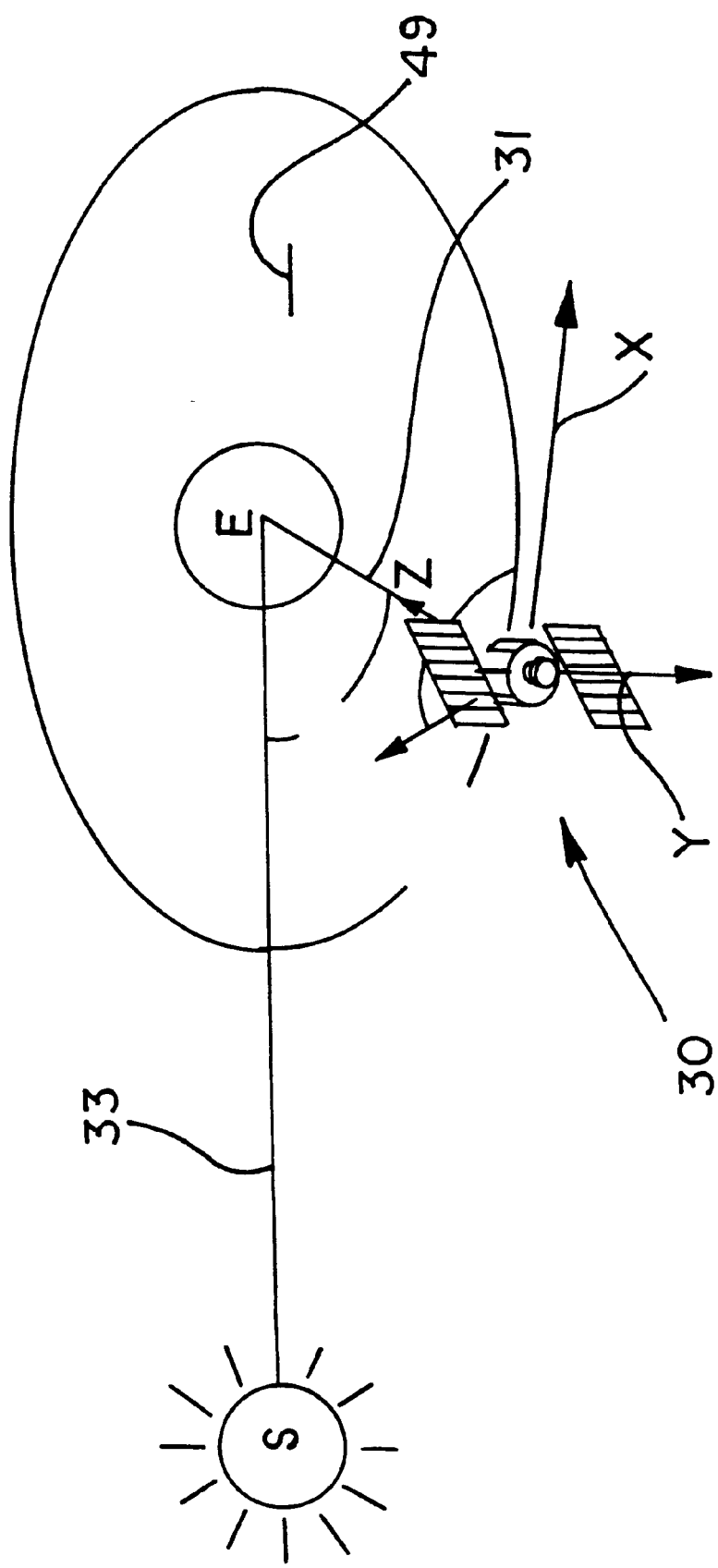
FIG. 3 is a schematic illustration representing the orientation of a satellite orbiting the Earth with the Sun shown positioned in the orbital plane.
Figure 4:
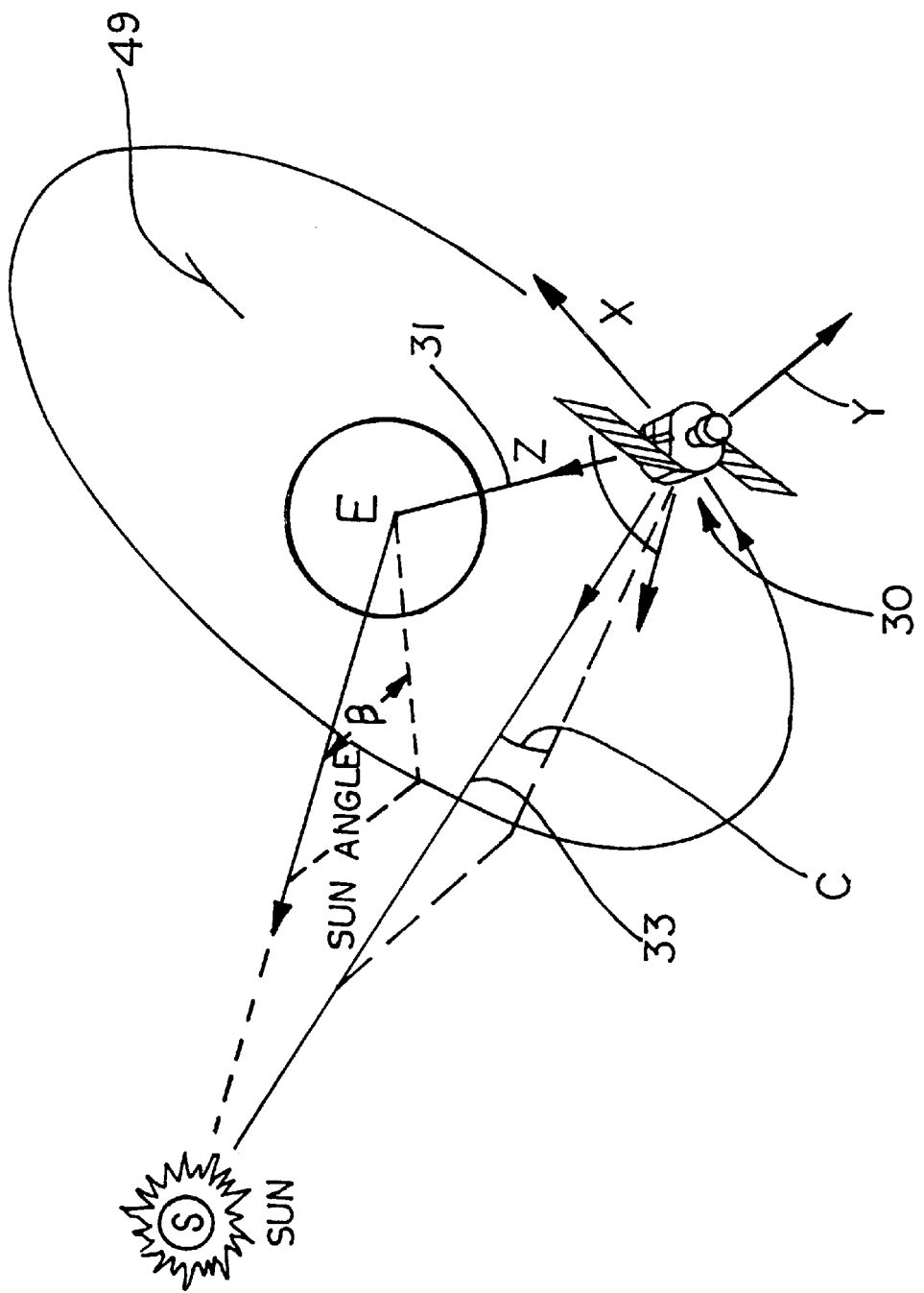
FIG. 4 is a schematic illustration representing the orientation of a satellite orbiting the Earth with the Sun shown positioned above the orbital plane.
Figure 5:
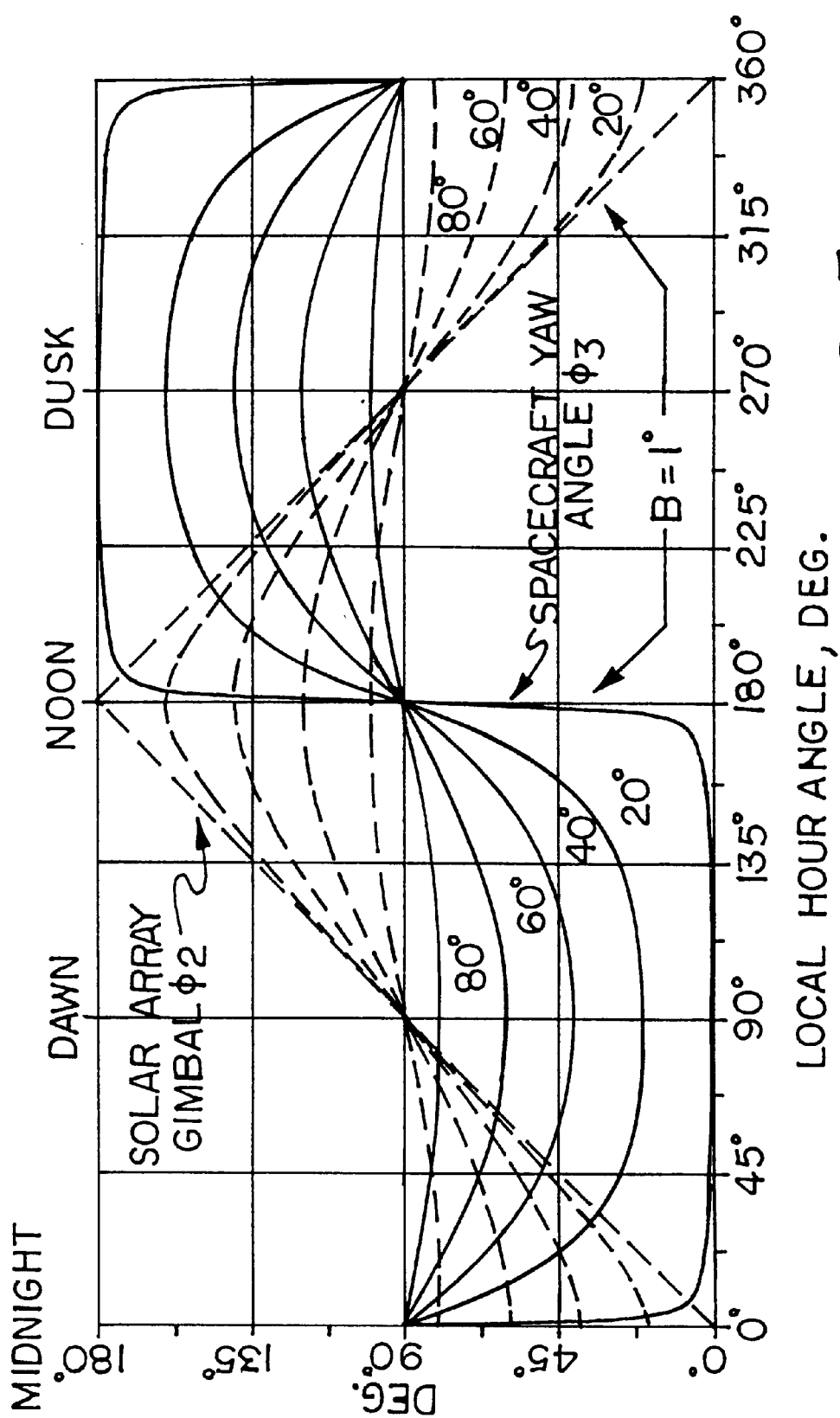
FIG. 5 is a graphical illustration of representative yaw steering and pitch requirements for a satellite in various orbits.

As shown in FIG. 2, for purposes of explanation, the satellite 30 will have three reference axes, X, Y, and Z. The yaw or Z axis is coincident with the satellite boresight, the pitch or Y axis is generally parallel to the yokes which support the solar wings (i.e., the yokes 38 and 38a described in greater detail below), and the roll or X axis is generally mutually perpendicular to the Y and Z axes. The nadir is indicated by the reference numeral 31 as shown in FIGS. 2, 3 and 4. The sunline is indicated by the reference numeral 33 and is also shown in FIGS. 3 and 4. In sun-nadir steering, the Z axis is generally coincident with the nadir 31, and the Y axis is generally perpendicular to the sunline.

In sun-nadir steering, it is desirable at all times to maintain the Sun in the X-Z plane. This is accomplished by maneuvering the satellite 30 about any two fixed axes as is well known. It will be noted that the orbit rate and the angular rate of the nadir will be the same (i.e., the rate of the nadir 31 rotating about the earth will depend on the rate of the satellite 30 orbiting the earth).

It will be noted that the derivation of the array gimbal angles, the body yaw angles, mechanism travel requirements, etc., may be accomplished using known and well accepted methods which are within the knowledge of one skilled in the art. Accordingly, the derivation of such angles will not be repeated herein. A discussion of sun-nadir steering may be found in U.S. Pat. No. 5,794,891 issued to Polle et al.

As shown in that FIG. 1, the satellite 30 includes a bus or body 35 which typically holds the control electronics, the navigational and telemetry electronics, and the antennas for the satellite. The satellite 30 also includes a pair of solar panels or wings 36. Each of the solar wings 36 includes a plurality of solar cells and is independently mounted on a yoke 38. As shown in FIG. 1, the yokes 38 typically extend from opposite sides of the body 35. The mounting yokes 38 and the satellite body 35 may be of a conventional design and will not be further discussed herein Each of the solar wings 36 is preferably a concentrator or Fresnel Lens array 39, in which a plurality of solar cells are located on a generally concave collection surface. Such an array 39 collects solar illumination over an area greater than the area of the solar cells, and then concentrates that gathered illumination onto the solar cells for power generation. As is known to those skilled in the art, a concentrator or Fresnel Lens array requires much greater pointing accuracy than do conventional solar arrays. As shown in FIG. 2, each of the solar wings 36 includes a normal vector 37. As would be known to those skilled in the art, the solar cells will generate the most power when the normal vector 37 is aligned with the sunline 33.

A control circuit 40 (FIG. 6) is operatively connected to the ACS 32 as well as to a pair of gimbals 43, 45 as shown in FIG. 2. Although the satellite 30 will preferably include a pair of solar wings 36, 36a, each of which is mounted to a yoke 38, 38a, respectively, only the structure and operation of a single solar wing 36 will be discussed in detail herein. It will be understood, however, that a second solar wing having the same or similar components may be attached to the satellite, typically to the opposite side of the body 35. The control circuit 40 is preferably a microprocessor of the type commercially available, as would be known to those skilled in the art.

The gimbals 43, 45 are provided in order to adjust the position of the solar wing 36 relative to the body 35. The gimbal 43 is moveable about an axis "A", while the gimbal 45 is moveable about an axis "B", as shown in FIG. 2. It will be understood that the axes A and B are mutually perpendicular, and that the axis A is generally parallel and coincident with a longitudinal axis of the yoke 38. For the purpose of rotating the solar wing 36 about the axis A, i.e., about an axis parallel to a longitudinal axis of the yoke 38, the satellite 30 includes a rotational motor 42. Preferably, the rotational motor 42 is controlled to pivot the solar wing 36 about the A axis to a position determined by the control circuit 40.

The gimbal 45 is provided for purposes of rotating the solar wing 36 about the B axis, i.e., about an axis perpendicular to the A axis and the longitudinal axis of the yoke 38. The satellite 30 includes a rotational motor 46 for rotating the gimbal 45 about the axis B. Preferably, the rotational motor 46 is controlled to pivot the wing 36 about the B axis to a position determined by the control circuit 40. As an alternative to using two gimbals 43, 45 on each yoke 38, a single gimbal having two degrees of freedom may be employed (i.e., a gimbal moveable about both axes A and B.

As an example, and referring to FIG. 3, if the Sun were located in the orbital plane 49, the sun would lie in the X-Z plane of the satellite 30. Accordingly, the solar wing 36 could be pointed toward the sun by rotating the gimbal 43 about the axis A using the rotational motor 42 (which rotation would effectively rotate the wing 36 purely in pitch—about the Y axis). However, in the event the Sun were located above the orbital plane 49, such as is shown in FIG. 4, then pointing of the wings 36 would be accomplished by also rotating the gimbal 45 about the B axis using the rotational motor 46. The same would hold true for circumstances in which the sun lies below the orbital plane, although accurate pointing would be effectuated by rotating the gimbals 43, 45 in the opposite directions.

As shown in FIG. 2, the angular position of the wing 36 about the axis A due to rotation of the gimbal 43 may be referred to as the solar panel angle $\phi_2$, while the yaw angle of the satellite 30 is referred to as the angle $\phi_3$. Finally, the sun elevation angle $\phi_4$ is the angular position of the wing 36 when rotated about the axis B using the gimbal 45. For a given orbit, the pertinent angles are calculated in accordance with well accepted spacecraft attitude control principles. As shown in FIG. 4, the angle between the sunline and the orbital plane is referred to as the declination angle C. Also shown in FIG. 4 is a line between the earth and the sun, which line forms an angle Beta ($\beta$), referred to as the sun angle. It will be noted that, due to the distance of the earth from the sun, the declination angle C and $\beta$ may be interchangeable, as they differ at most on the order of 4 hundredths of a degree (0.04 degrees).

As explained in detail below, the ACS 32 of the satellite 30 is programmed for sun-nadir steering, and the satellite 30 is adapted to position the solar wing(s) 36 of the satellite 30 in order to maximize the amount of power produced by the solar cells located thereon. The ACS 32 is preferably mounted within or on the body 35 of the satellite 30.

Preferably, the motors 42 and 46 are implemented as conventional stepper motors such as are commercially available from such vendors as Ducommon-AEI of Carson, Calif. or Tecstar Electro-Systems Division of Durham, N.C. However, persons of ordinary skill in the art will appreciate that other motors can be implemented as well. Similarly, while persons of ordinary skill in the art will appreciate from the above disclosure that only one pivoting motor and one rotational motor are needed to maintain the surface of a solar panel substantially perpendicular to the solar illumination arriving from the sun, in the preferred embodiment two rotational motors and two pivoting motors are used for each yoke 38 for purposes of redundancy. Preferably, these paired motors are redundantly arranged such that either one of the motors 42 or either one of the motors 46 can pivot the solar wing 36 about the required axis if the other motor in the pair fails.

Persons of ordinary skill in the art will further appreciate that, although the above description has assumed that the satellite 30 includes two solar wings 36 and two yokes 38, the teachings of the invention can be applied to satellites having any number of wings 36 and yokes 38 including, but not limited to one wing 36 and one yoke 38. In instances where two wings 36 and two yokes 38 are employed, the wing/yoke pairs are preferably located on opposite sides of the satellite body 35, and the pivoting motors 46 are preferably controlled to pivot the solar wings 36 in substantially equal but opposite directions so that the wings 36, 36a remain substantially parallel, while the rotational motors are preferably controlled to rotate the solar wings 36 in substantially equal directions.

Figure 6:
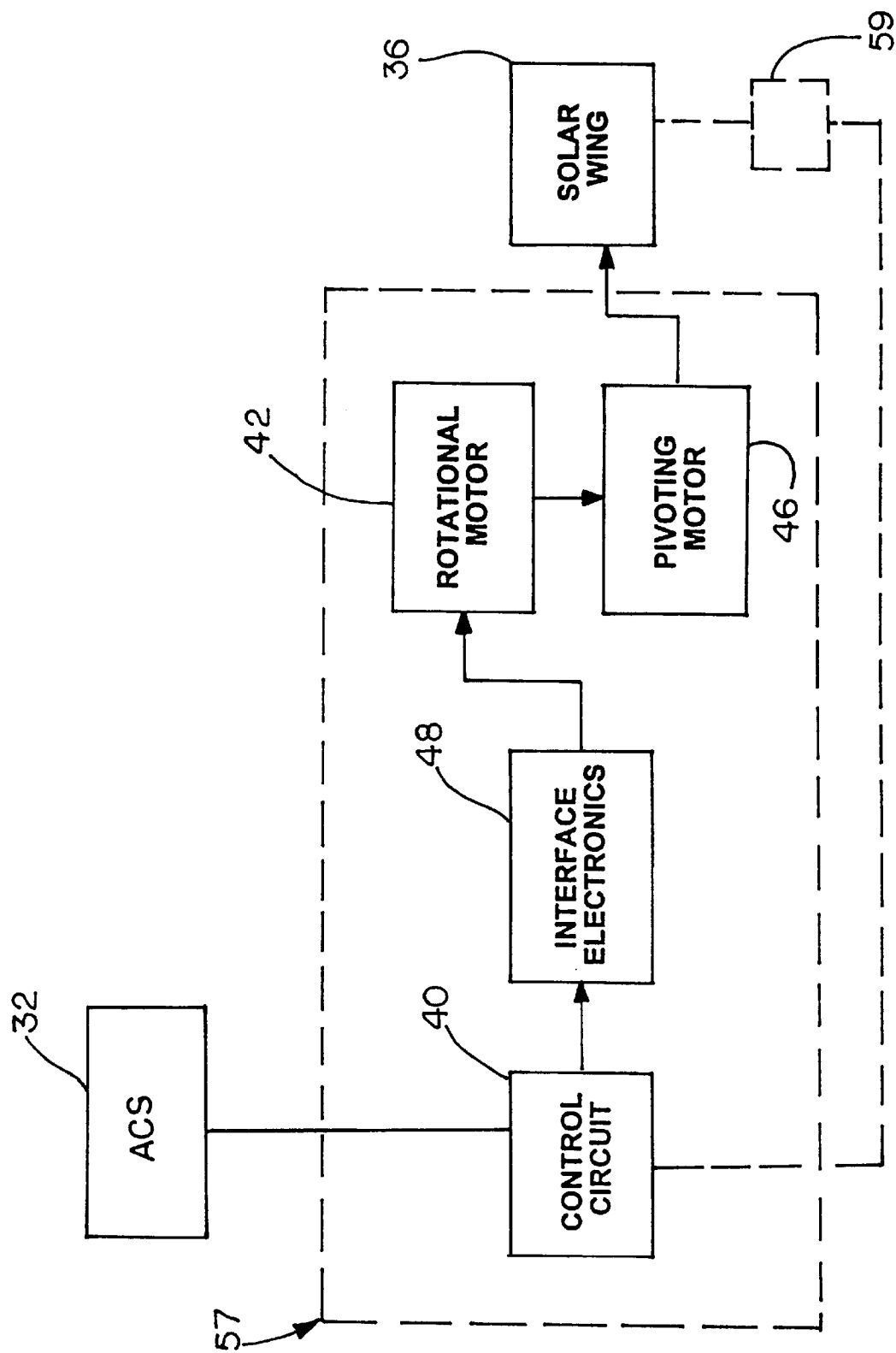
FIG. 6 is a schematic illustration of an open loop control system for pointing a solar wing of the satellite shown in FIGS. 1 and 2.

Referring to FIG. 6, an open loop control circuit 57 is shown. The open loop control circuit 57 includes the control circuitry 40, which may be operatively connected to interface electronics 48. The control circuit 40 is also operatively connected to the ACS 32. The interface electronics 48 preferably include the circuitry necessary to permit communication between the control circuit 40 and the motors 42, 46, which are connected to the solar wing 36. For example, the interface electronics 48 preferably include a digital to analog converter and/or voltage conversion circuitry to convert the output of the control circuit 40 to a level and format usable by the motors 42, 46. The interface electronics 48 thus permit the control circuit 40 to control the position of the solar wing 36 using the motors 42, 46.

Figure 7:
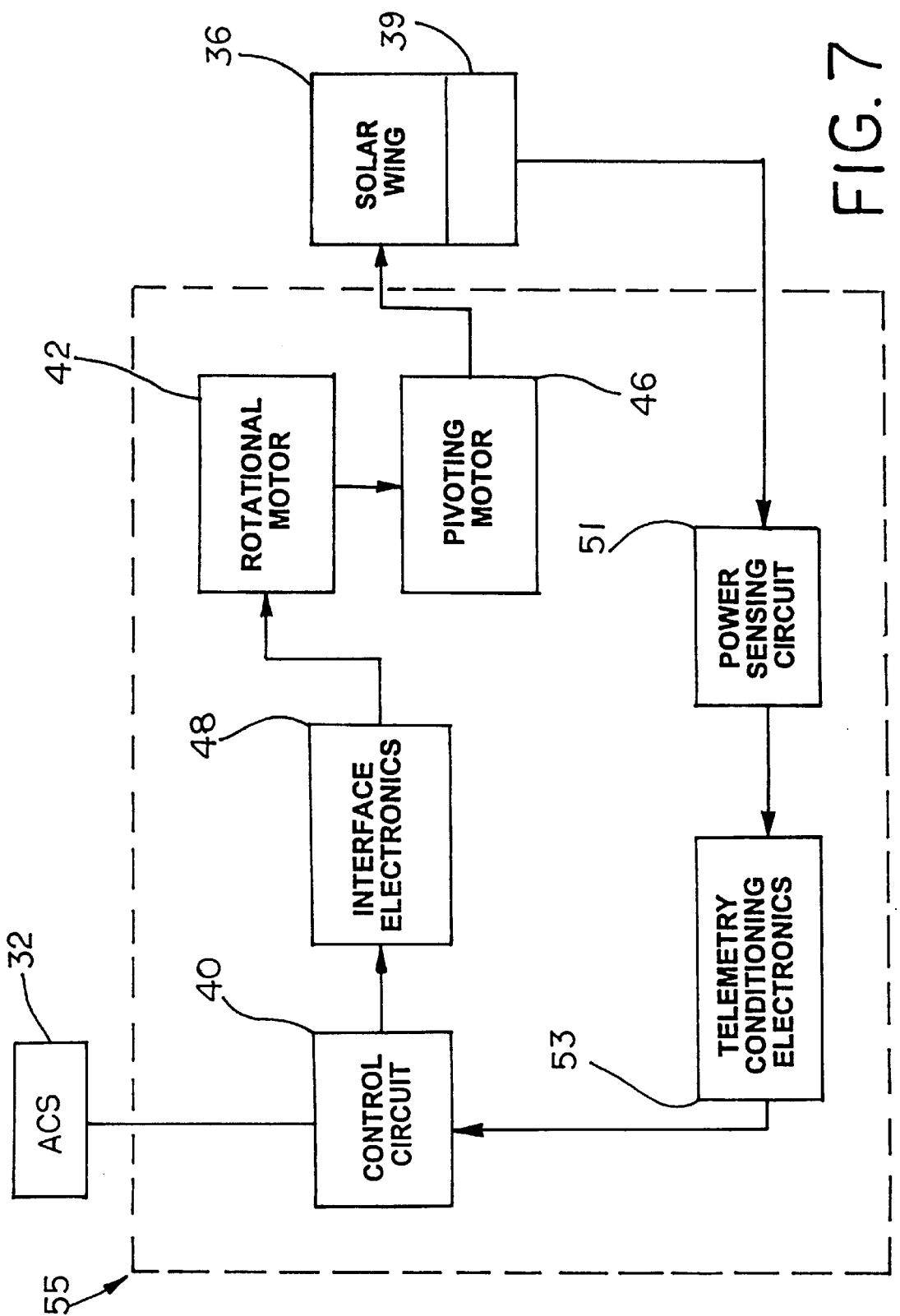
FIG. 7 is a schematic illustration of a closed loop control system for pointing the solar wing of the satellite shown in FIGS. 1 and 2.

Referring to FIG. 7, a closed loop control circuit 55 is shown. The closed loop control circuit 55 includes the control circuit 40, which may be operatively connected to a power sensing circuit 51 and telemetry conditioning electronics 53, as well as to the interface electronics 48 and the motors 42, 46. The motors 42, 46 are in turn operatively connected to the solar wing 36, and the solar array 39 on the solar wing 36 is operatively connected to the power sensing circuit 51. The closed loop control circuit 55 is operatively connected to the ACS 32, and establishes the desired position of the solar wing 36. The power sensing circuit 51 is preferably adapted to sense the amount of power being produced by the array 39, and will generate a signal which is communicated to the telemetry conditioning electronics 53, processes the signal to generate a signal indicative of the optimum position for the solar wing 36, which signal is then communicated to the control circuit, which then effectuates the desired position change for the solar wing 36 via the interface electronics 48 and the motors 42, 46. Thus, the closed loop circuit 55, based on sensed increases or decreases in the amount of power being produced, makes appropriate changes to the position of the solar wing 36.

As an alternative, a sun sensor 59 (illustrated schematically in phantom in FIG. 6) may be mounted the solar wing 36 to sense the solar wing attitude, in place of the power sensing circuit 51 and solar array 39 arrangement shown.

Quantitative Example

Figure 12:
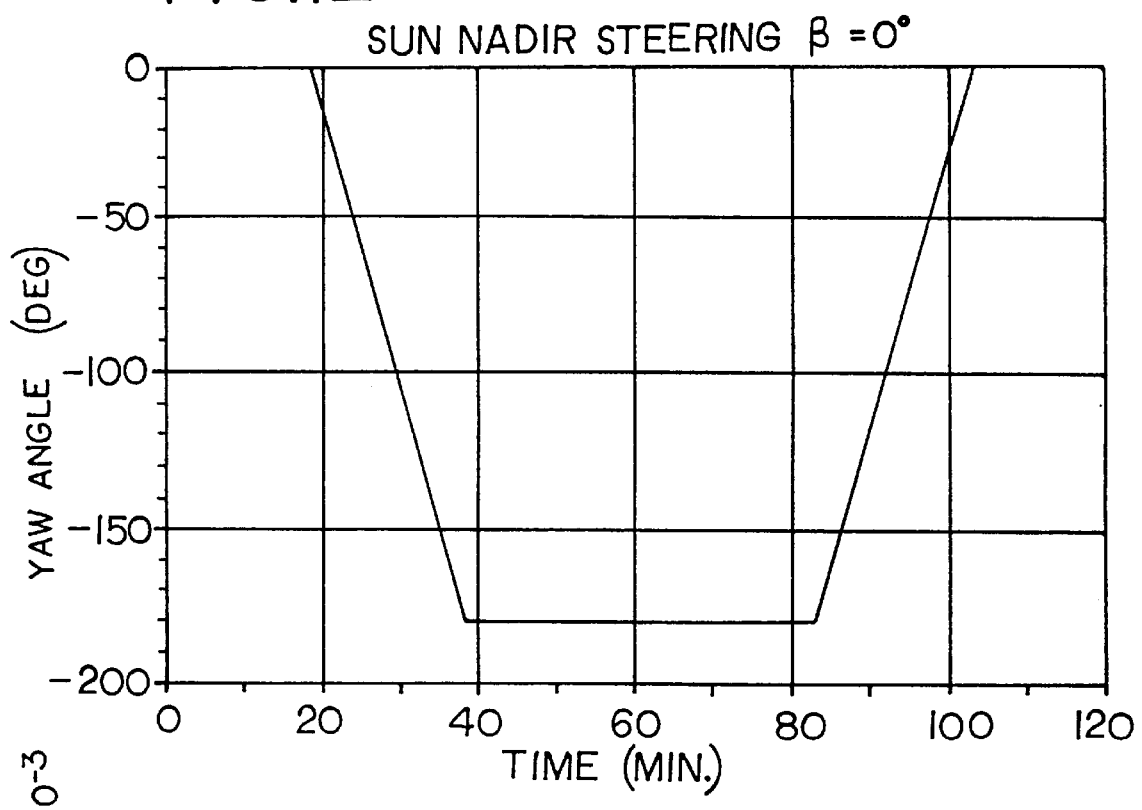
FIG. 12 is a graphical representation of the yaw angle as a function of time for a satellite performing sun-nadir, rate limited steering in a given orbit with a Beta angle of 0°.
Figure 13:
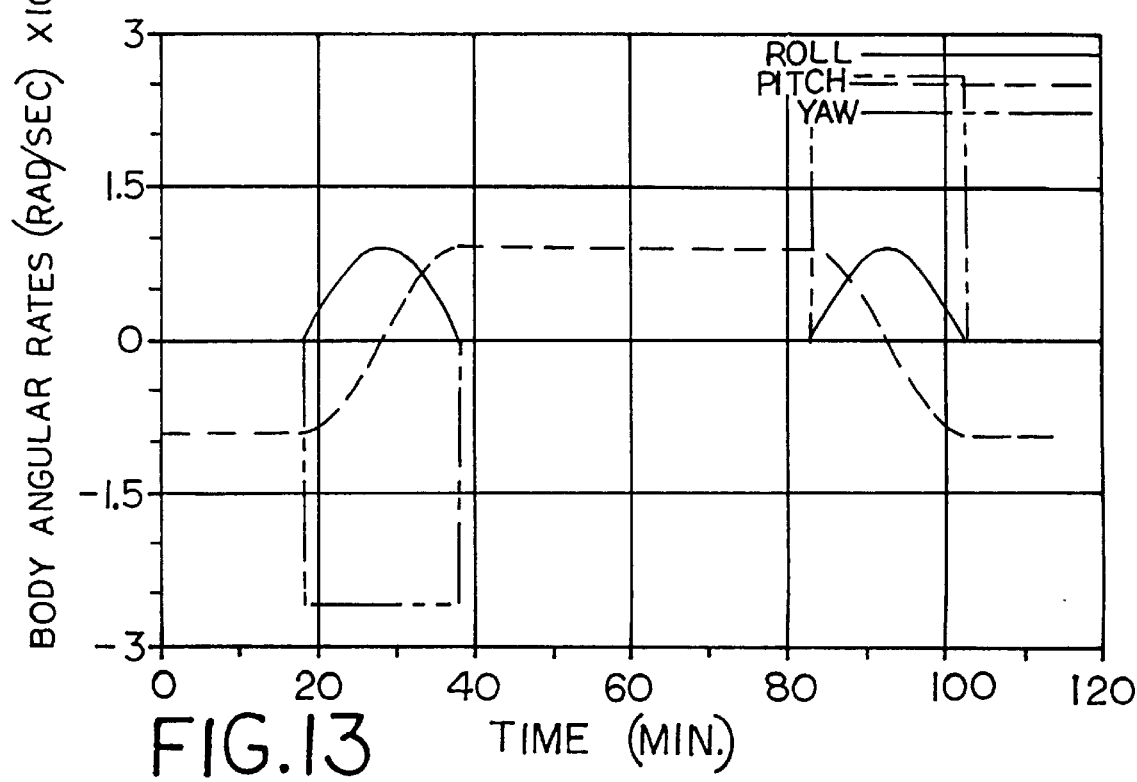
FIG. 13 is a graphical representation of the body angular rates for roll, pitch and yaw over time for a satellite performing sun-nadir, rate limited steering in a given orbit with a Beta angle of 0°.
Figure 14:
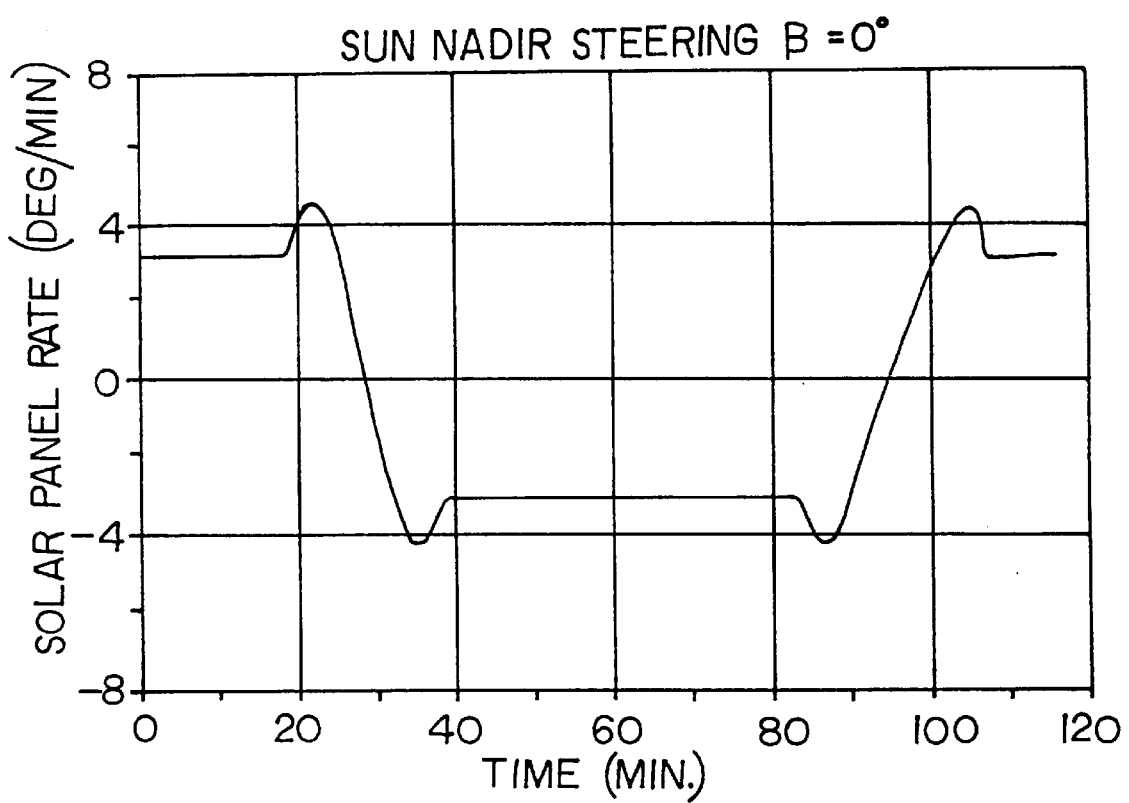
FIG. 14 is a graphical representation of the solar panel angular rate about the inner gimbal over time for a satellite performing sun-nadir, rate limited steering in a given orbit with a Beta angle of 0°.
Figure 15:
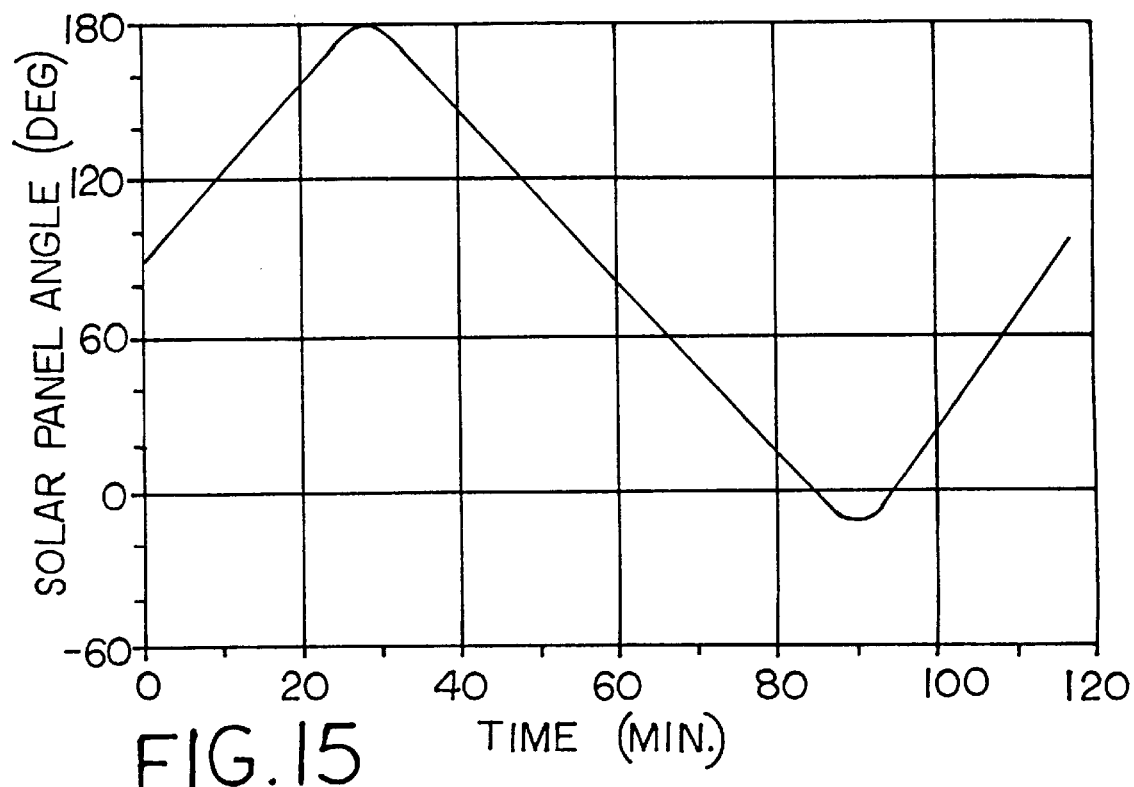
FIG. 15 is a graphical representation of the solar panel angle about the inner gimbal over time for a satellite performing sun-nadir, rate limited steering in a given orbit with a Beta angle of 0°.
Figure 16:
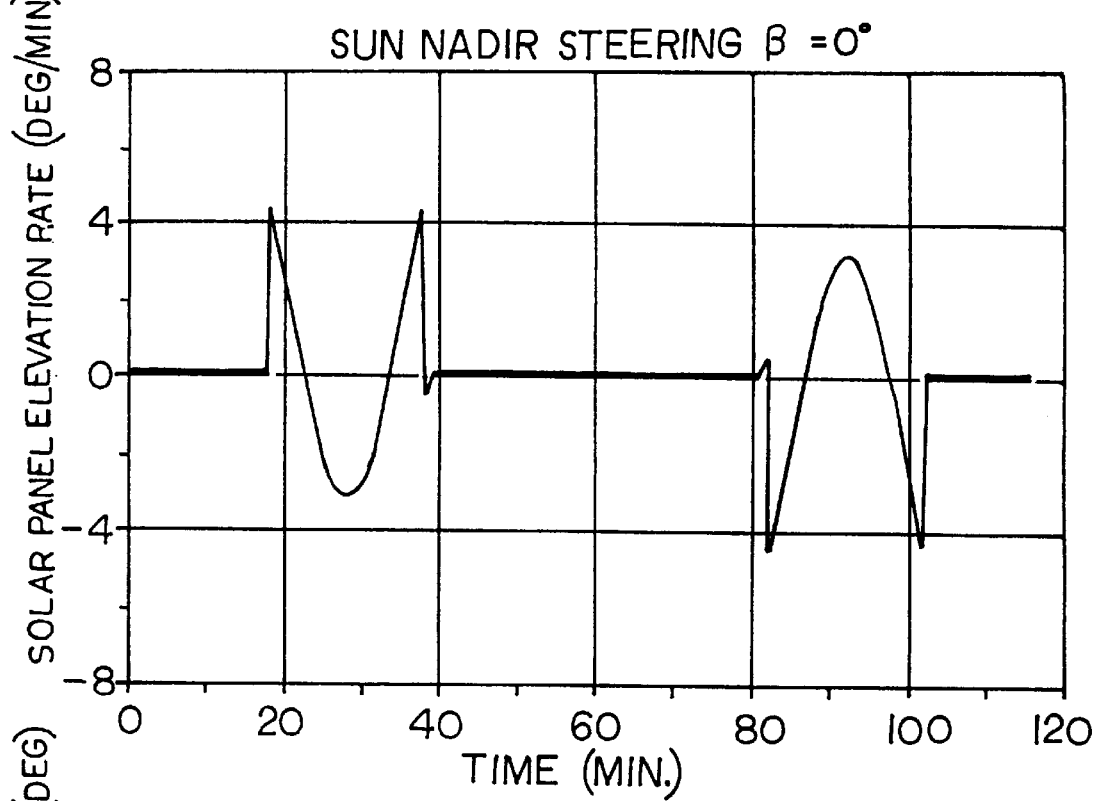
FIG. 16 is a graphical representation of the solar panel angular rate about the outer gimbal over time for a satellite performing sun-nadir, rate limited steering in a given orbit with a Beta angle of 0°.
Figure 17:
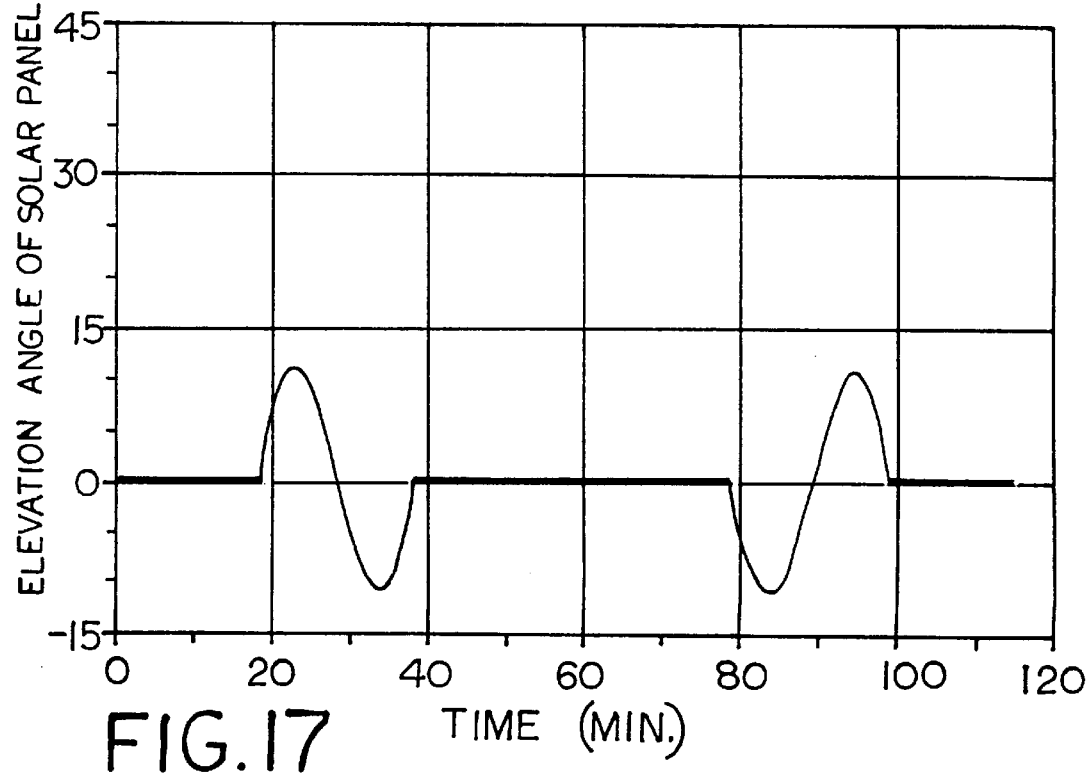
FIG. 17 is a graphical representation of the solar panel angle about the outer gimbal over time for a satellite performing sun-nadir, rate limited steering in a given orbit with a Beta angle of 0°.
Figure 18:
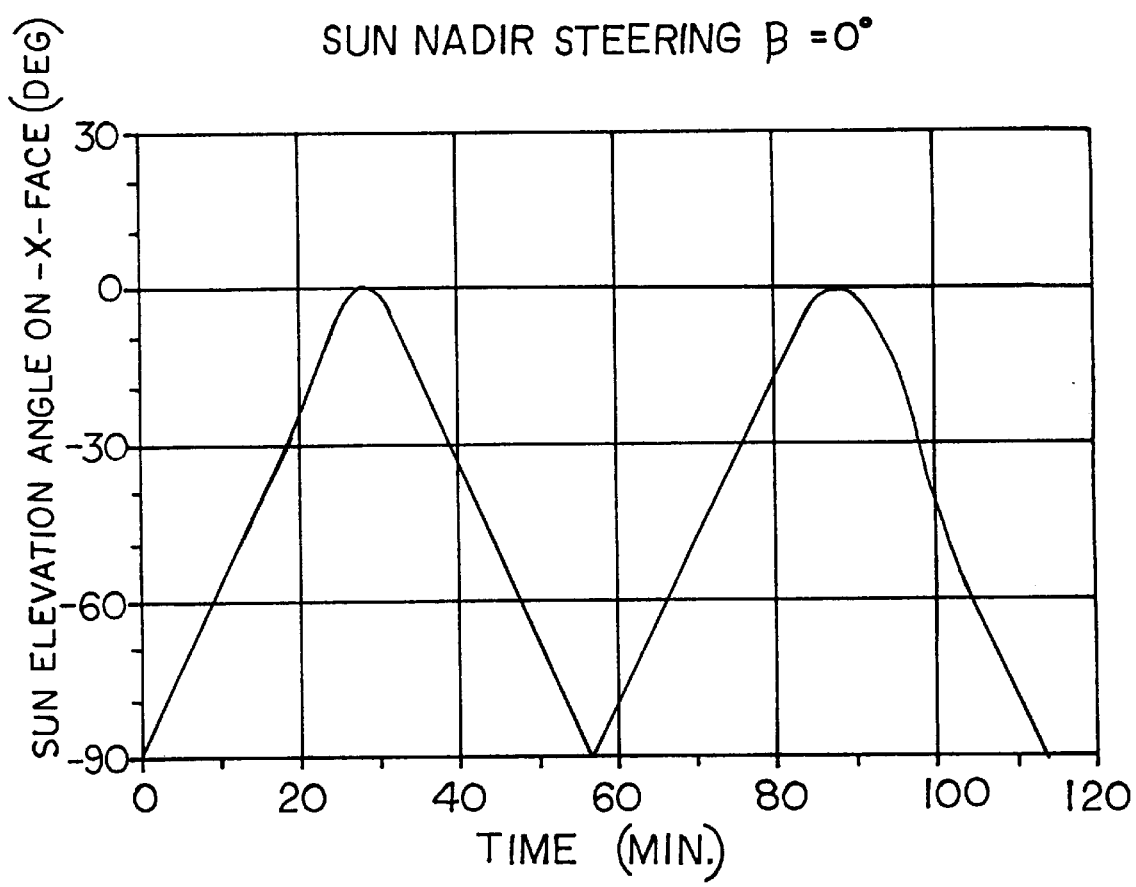
FIG. 18 is a graphical representation of the sun elevation angle relative to the satellite for a satellite performing sun-nadir, rate limited steering in a given orbit with a Beta angle of 0°.

The gimbal angle profiles for a satellite in a 1400 km orbit having an orbital period of approximately 115 minutes were calculated. FIG. 12 is a graphical representation of the spacecraft yaw angle over time for a Beta angle of 0° (zero degrees), while FIG. 13 is a graphical representation of the body angular rates in roll pitch and yaw for the same orbit. FIGS. 14 and 15 are graphical representations of the angular rate and the angle, respectively, of the solar panel about the A axis (i.e., rotation of the gimbal 43) for the same orbit. FIG. 16 and 17 are graphical representations of the angular rate and the angle, respectively, of the solar panel about the B axis (i.e., rotation of the gimbal 45) for the same orbit. FIG. 18 is a graphical representation of the sun elevation angle on the -X face of the satellite body for the same orbit.

Figure 19:
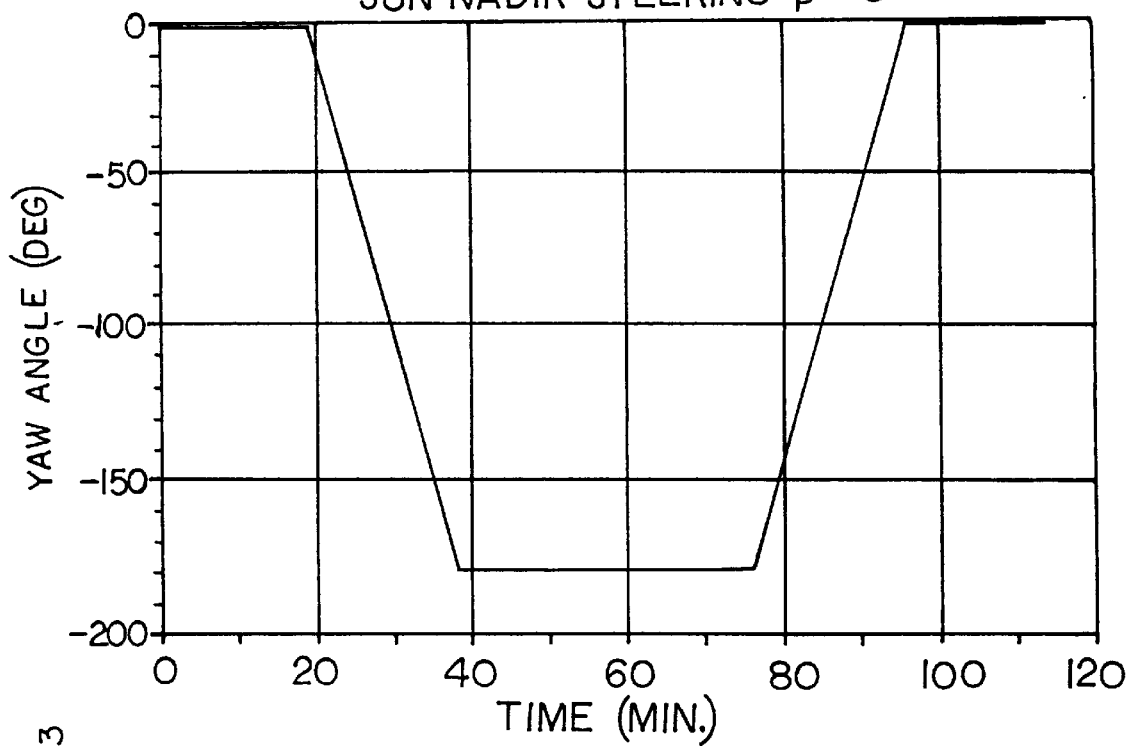
FIG. 19 is a graphical representation of the yaw angle as a function of time for a satellite performing sun-nadir, rate limited steering in a given orbit with a Beta angle of 1°.
Figure 20:
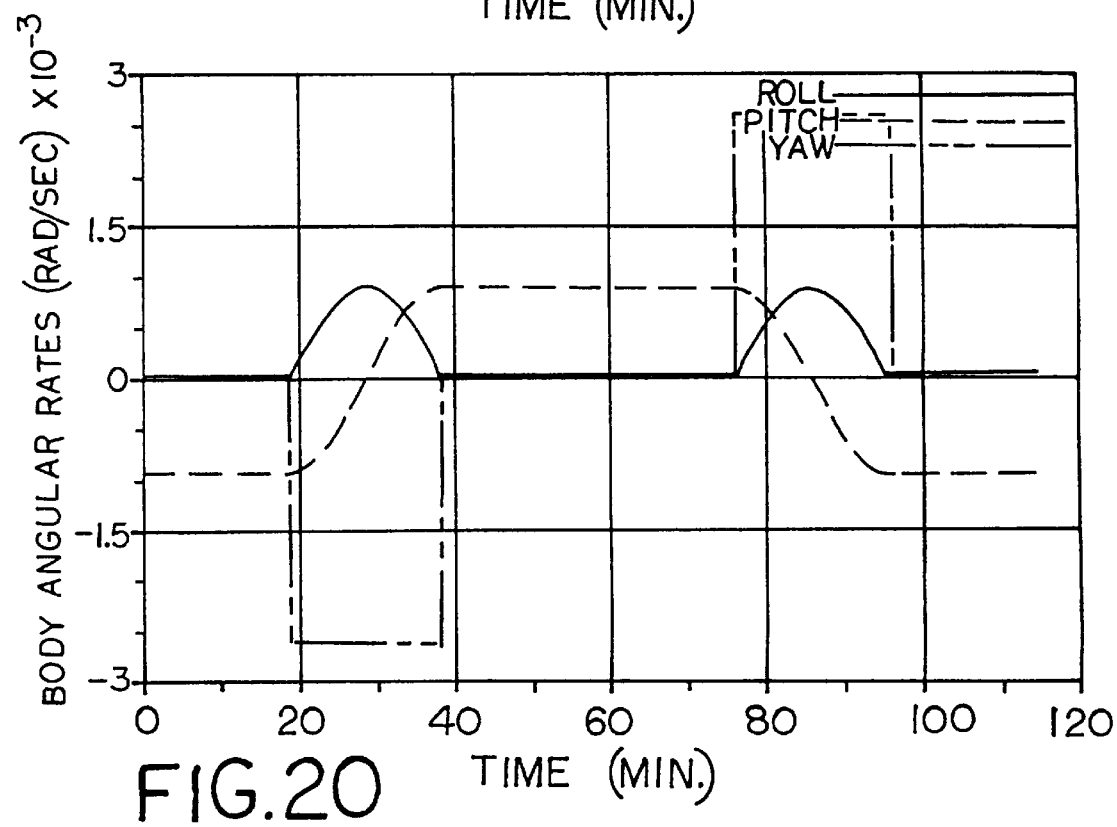
FIG. 20 is a graphical representation of the body angular rates for roll, pitch and yaw over time for a satellite performing sun-nadir, rate limited steering in a given orbit with a Beta angle of 1°.
Figure 21:
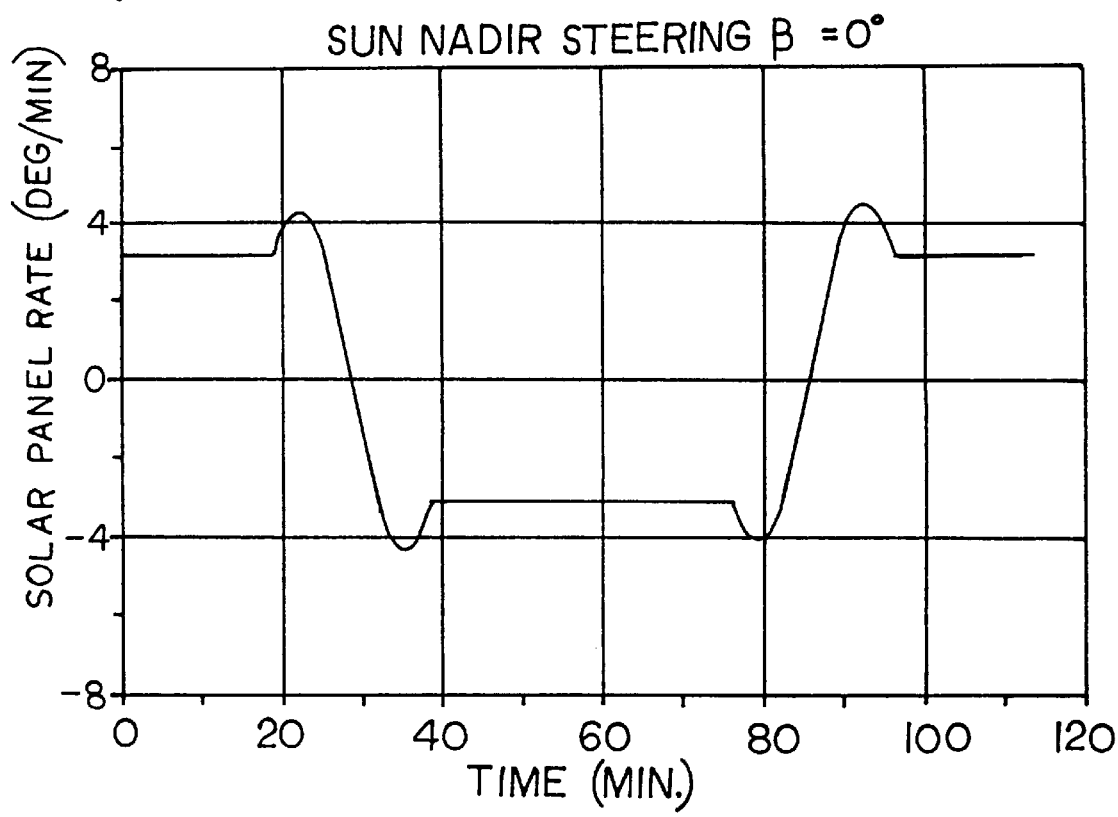
FIG. 21 is a graphical representation of the solar panel angular rate about the first gimbal over time for a satellite performing sun-nadir, rate limited steering in a given orbit with a Beta angle of 1°.
Figure 22:
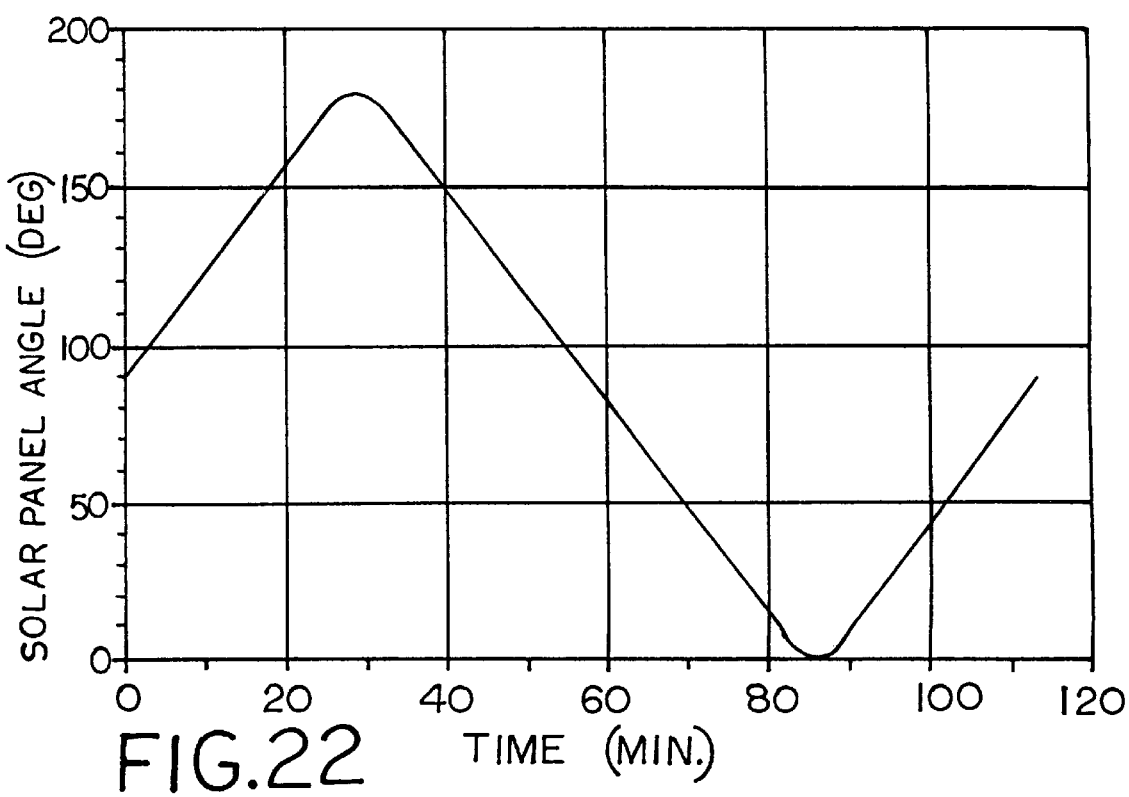
FIG. 22 is a graphical representation of the solar panel angle over time for a satellite performing sun-nadir, rate limited steering in a given orbit with a Beta angle of 1°.

Referring now to FIGS. 19–22, the gimbal angle profiles are shown for a similar orbit, but the Beta angle has been increased to 1°. FIG. 19 is a graphical representation of the spacecraft yaw angle over time for the Beta angle of 1° (one degree), while FIG. 20 is a graphical representation of the body angular rates in roll pitch and yaw for the same orbit. FIGS. 21 and 22 represent the angular rate and the angle, respectively, of the solar panel about the A axis (i.e., rotation of the gimbal 43) for the same orbit.

In both of the above illustrations, it can be seen that the angular rates are substantially reduced over prior art systems, while also providing for more accurate pointing of the solar arrays toward the sun.

In operation, the satellite body 35 is rotated in yaw about the Z axis (i.e., about nadir 31), in order to keep the angle between the sunline 33 and the axis A close to perpendicular. The solar wing 36 is then rotated about axis A to orient the normal vector 37 as close as possible to the sunline 33. Preferably, the rotation of the gimbal 43 about the axis A ($\phi_2$) will be at an angular rate not substantially greater than the orbit angular rate, so as to maintain the normal vector 37 close to the sunline 33. The solar wing 36 is then rotated relative to the B axis by rotating the gimbal 45. Preferably, the angular rotation of the gimbal 45 about the axis B ($\phi_4$) may be less than, and in some cases substantially less than, 20° (twenty degrees), and will bring the normal vector 37 even closer to the sunline 33. The Fresnel Lens array on the solar wing 36 will then collect solar power from the solar illumination over an area substantially greater than the area of the solar cells, and will focus the solar power onto the solar cells in order to produce electrical power. The position of the solar wing 36, and thus the angular rotation of the solar wing 36 about the axes A and B, will be controlled by the control circuit 40 using well known principles.

Figure 8:
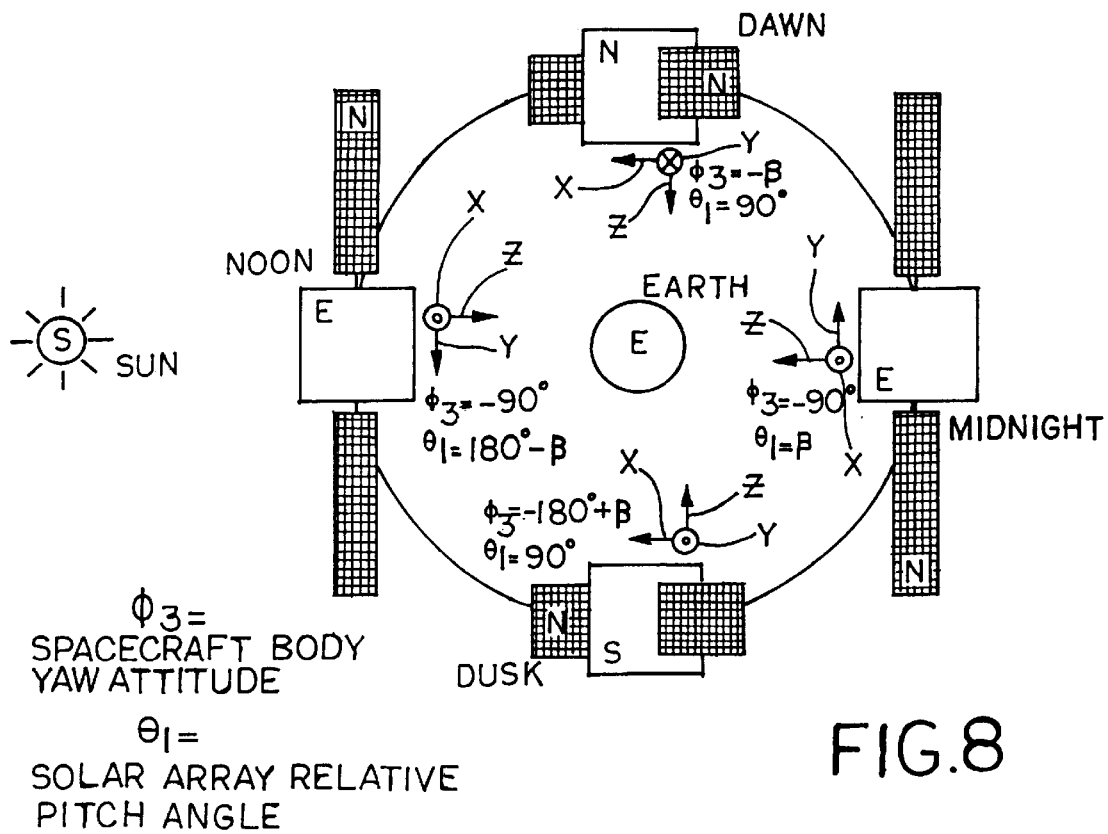
FIG. 8 is a schematic illustration of Sun-Nadir steering geometry of a satellite in an equatorial orbit in the summer (i.e., the sun being above the plane of the page)
Figure 9:
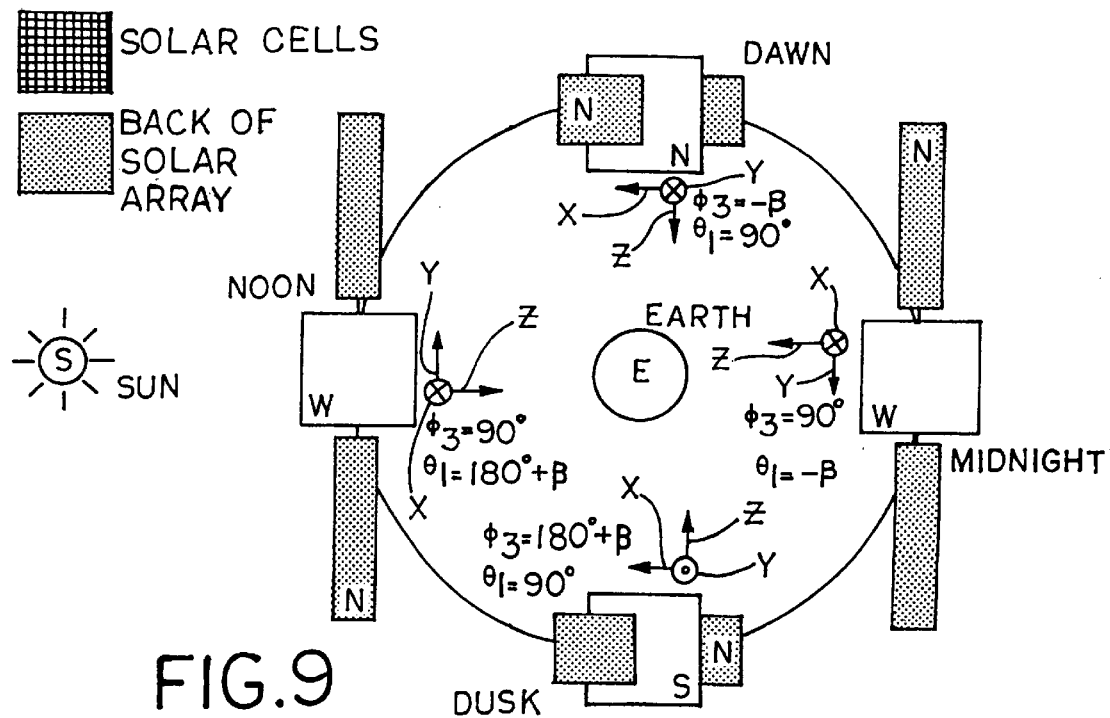
FIG. 9 is a schematic illustration of Sun-Nadir steering geometry of a satellite in an equatorial orbit in the winter (i.e., the sun being below the plane of the page)
Figure 10:
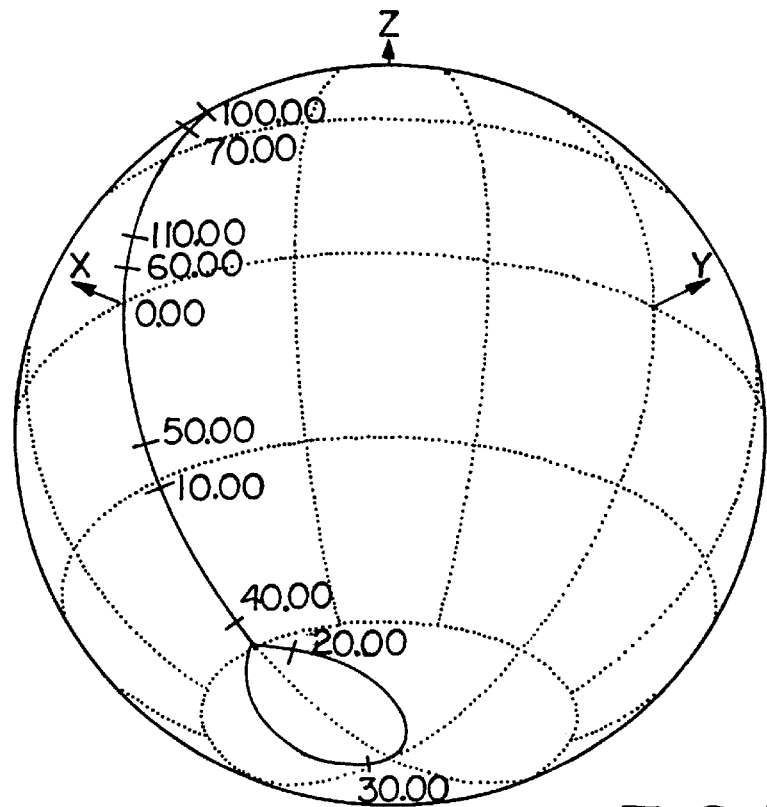
FIG. 10 is a schematic illustration of the position of the sun relative to the axes of a satellite in an inclined orbit having an orbital period of approximately 115 minutes and illustrating the sun tracking pointing error during the first turn.
Figure 11:
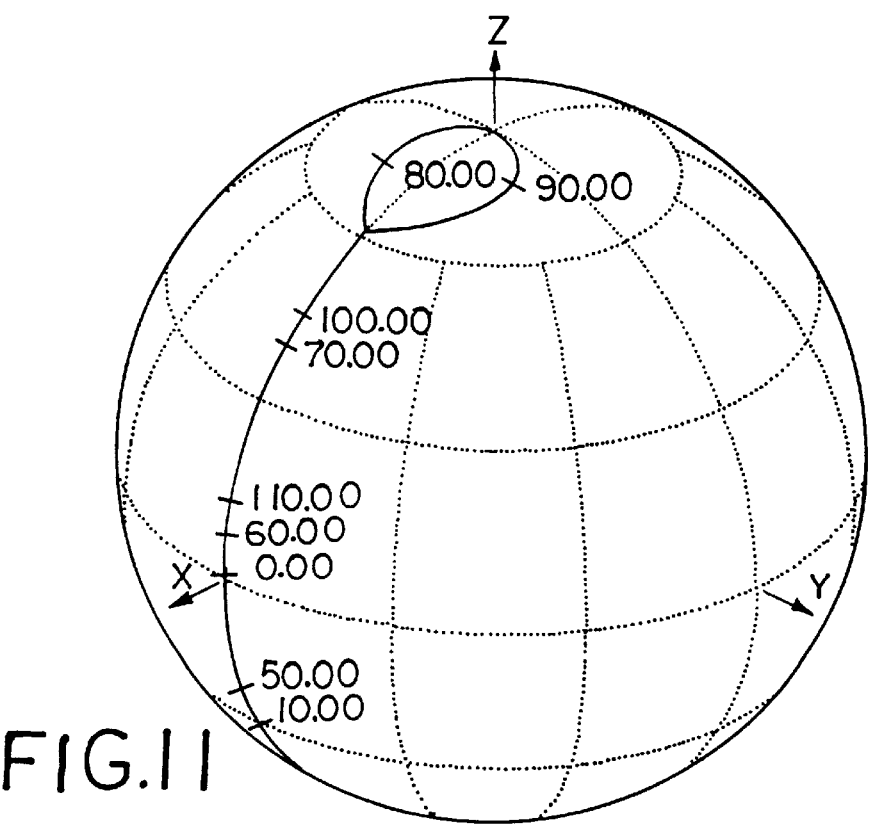
FIG. 11 is a schematic illustration of the position of the sun relative to the axes of a satellite in an inclined orbit having an orbital period of approximately 115 minutes and illustrating the sun tracking pointing error during the second turn.

FIGS. 8 and 9 illustrate the interplay between the spacecraft body yaw attitude and the solar array relative pitch angle for various spacecraft positions in the orbit.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed:

1. A satellite (30) for use in a non-geostationary orbit, comprising:
    a satellite body (35);
    an onboard attitude control system (32) programmed for sun-nadir steering;
    a solar wing (36) mounted to the satellite body by a gimbal (43,45), the gimbal having two degrees of freedom to thereby permit the solar wing (36) to be rotated about two mutually orthogonal axes (A, B), the solar wing (36) including at least one solar array;
    a first motor (42) in operative engagement with the gimbal (43) for selectively rotating the solar wing about a first axis (A);
    a second motor (46) in operative engagement with the gimbal (45) for selectively rotating the solar wing (36) about a second axis (B); and
    a control circuit (40) in operative engagement with the first and second motors (42, 46) for selectively causing the first motor to rotate the solar wing about the first axis to a predetermined position and for selectively causing the second motor to rotate the solar wing about the second axis to a predetermined position.

2. The device of claim 1, wherein the first and second motors (42, 46) comprise a stepper motor.

3. The device of claim 1, wherein the control circuit causes the first and second motors (42, 46) to move the solar wing (36) about the first and second axes (A, B) to a position wherein a normal vector (37) of the solar array is parallel to sunlight.

4. The device of claim 3, wherein the control circuit (40) is programmed to maintain the solar array within 1° of perpendicular to the sunlight.

5. The device of claim 1, wherein the solar array (39) comprises a concentrator array.

6. The device of claim 1, including a power sensing circuit (51) arranged to monitor the amount of power produced by the solar array (39), and wherein the control circuit (40) is operatively connected to the power sensing circuit (51) and is adapted to select the position of the solar wing (36) based on the amount of power received by the solar array (39).

7. The device of claim 1, including a sun sensor (59) arranged to monitor the amount of sunlight received by the solar array (39), and wherein the control circuit (40) is operatively connected to the sun sensor (59) and is adapted to select the position of the solar wing (36) based on the amount of sunlight received by the sun sensor (59).

8. The device of claim 1, wherein the control circuit (40) selects the position of the solar wing (36) based on ephemeris data stored in memory (53).

9. The device of claim 1, wherein the control circuit (40) comprises a microprocessor.

10. The device of claim 1, including a closed loop circuit for controlling the movement of the solar wing about the first and second axes (A, B).

11. The device of claim 10, wherein the closed loop circuit comprises the control circuit (40), the first and second motors (42, 46), the solar wing (36), and a power sensing circuit (51).

12. The device of claim 1, including a second solar wing (36a) having attached thereto a second solar array (39a), the first and second solar wings (36, 36a) being located on opposite sides of the satellite body (35), the second solar wing being mounted to the satellite body by a gimbal having two degrees of freedom to thereby permit the solar wing to be rotated about two mutually orthogonal axes, the second gimbal being in operative engagement with the first and second motors (42, 46) for selectively rotating the second solar wing about the first and second axes, respectively.

13. The device of claim 12, wherein the control circuit (40) is adapted to pivot the solar wings (36, 36a) in equal directions about the first axis (A), and further wherein the control circuit is adapted to pivot the solar wings in opposite directions about the second axis (B).

14. A satellite (30) for use in a non-geostationary orbit, comprising:
    a satellite body (35);
    an onboard attitude control system (32) programmed for sun-nadir steering;
    a solar wing (36) mounted to the satellite body (35), the solar wing being adapted to be rotatable about a first axis (A), the solar wing further being adapted to be rotatable about a second axis (B) perpendicular to the first axis, the solar wing including at least one solar array (39);
    a first motor (42) in operative engagement with the solar wing (36) for selectively rotating the solar wing about the first axis (A);
    a second motor (46) in operative engagement with the solar wing (36) for selectively rotating the solar wing about a second axis (B); and
    a control circuit (40) in operative communication with the first and second motors for selectively causing the first motor to rotate the solar wing about the first axis and for selectively causing the second motor to rotate the solar wing about the second axis.

15. The device of claim 14, wherein the first and second motors (42, 46) comprise stepper motors.

16. The device of claim 14, wherein the control circuit (30) causes the first and second motors (42, 46) to move the solar wing (36) about the first and second axes (A, B) to a position wherein a normal vector (37) of the solar array is parallel to the sunline (33).

17. The device of claim 16, wherein the control circuit (40) is programmed to maintain the normal vector (37) within 1° of the sunline (33).

18. The device of claim 14, wherein the solar array (39) comprises a concentrator array.

19. The device of claim 14, including a power sensing circuit (51) arranged to monitor the amount of power produced by the solar array (39), and wherein the control circuit (40) is operatively connected to the power sensing circuit (51) and is adapted to select the position of the solar wing (36) based on the amount of power produced by the solar array (39).

20. The device of claim 14, including a sun sensor (59) arranged to monitor the amount of sunlight received by the solar array (39), and wherein the control circuit (40) is operatively connected to the sun sensor (59) and is adapted to select the position of the solar wing (36) based on the amount of sunlight received by the sun sensor (59).

21. The device of claim 14, wherein the control circuit selects the position of the solar wing based on ephemeris data stored in memory (53).

22. The device of claim 14, wherein the control circuit (40) comprises a microprocessor.

23. The device of claim 14, including a closed loop circuit (55) for controlling the movement of the solar wing (36) about the first and second axes (A, B).

24. The device of claim 23, wherein the closed loop circuit (55) comprises the control circuit (40), the first and second motors (42, 46), the solar wing (36), and a power sensing circuit (51).

25. The device of claim 14, including a second solar wing (36a) having attached thereto a second solar array, the first and second solar wings (36, 36a) being located on opposite sides of the satellite body (35), the second solar wing (36a) being mounted to the satellite body by a gimbal having two degrees of freedom to thereby permit the solar wing to be rotated about two mutually orthogonal axes (A, B), the second gimbal being in operative engagement with the first and second motors for selectively rotating the second solar wing about the first and second axes, respectively.

26. The device of claim 25, wherein the control circuit (40) is adapted to pivot the solar wings (36, 36a) in equal directions about the first axis (A), and further wherein the control circuit is adapted to pivot the solar wings in opposite directions about the second axis (B).

27. A method for decreasing the power requirements of a satellite (30) in a low earth orbit, the satellite including solar wing (36) having a power generating solar array (39), the method comprising the steps of:

programming an onboard attitude control system (32) for sun-nadir steering;

rotating the solar wing (36) about a first axis (A); and pivoting the solar wing (36) about a second axis (B) to maintain the solar array (39) normal to a sunline (33).

28. A method as defined in claim 27, wherein the step of pivoting the solar wing (36) about the second axis (B) further comprises the steps of retrieving ephemeris data from memory (53), and determining the sun position relative to nadir and orbit normal.

* * * * *